United States Patent [19]

Plum et al.

[11] Patent Number: 4,817,027

[45] Date of Patent: Mar. 28, 1989

[54] METHOD AND APPARATUS FOR EVALUATING PARTIAL DERIVATIVES

[75] Inventors: Thomas M. Plum; T. David Green, both of La Jolla, Calif.

[73] Assignee: Cook Imaging, La Jolla, Calif.

[21] Appl. No.: 28,953

[22] Filed: Mar. 23, 1987

[51] Int. Cl.$^4$ .......................................... G06F 15/328
[52] U.S. Cl. .................................................. 364/732
[58] Field of Search ............................... 364/732, 810

[56] References Cited

U.S. PATENT DOCUMENTS

| | | | |
|---|---|---|---|
| 3,590,229 | 6/1971 | Humphreys | 364/732 |
| 3,928,756 | 12/1975 | Auray | 364/732 |
| 4,511,219 | 4/1985 | Giles et al. | 350/388 |

FOREIGN PATENT DOCUMENTS

| | | |
|---|---|---|
| 457999 | 1/1975 | U.S.S.R. |
| 817728 | 3/1981 | U.S.S.R. |
| 1105913 | 7/1984 | U.S.S.R. |

OTHER PUBLICATIONS

Liebowitz, "Numerical Solutions to Differential Equations", *Electro-Technology*, Apr. 1962, pp. 105–115.

*Primary Examiner*—David H. Malzahn
*Attorney, Agent, or Firm*—Leydig, Voit & Mayer

[57] ABSTRACT

The present invention provides a novel method and apparatus for the automatic evaluation of partial derivatives. A computer memory system is organized and controlled so that partial derivatives are evaluated, without approximation, for any given function at specified values of the independent variables of the function. The method involves parsing the given function and assigning codes, including priority order, to each function element. The function elements are then examined individually along with their priority codes by an interpreter which determines when an operation should be performed. To perform operations which result in the evaluation of partial derivatives, there is provided an evaluation matrix to organize and store values, and an evaluator which is used to manipulate the evaluation matrix for operations specified by the interpreter. The evaluator performs manipulations on the evaluation matrix by using a number of sets of instructions which are derived from the rules defining partial derivatives. The parser, interpreter, evaluator and organized memory system work together to provide an efficient means, operable on a simple digital computer, for performing an accurate and fast evaluation of the partial derivatives.

8 Claims, 14 Drawing Sheets

FUNCTION ARRAY  87

| "a" | "*" | "(" | "b" | "-" | "c" | ")" | * | 3 | | |
|---|---|---|---|---|---|---|---|---|---|---|

PARSED LIST  15

| | | | | | | | | | | | |
|---|---|---|---|---|---|---|---|---|---|---|---|
| PRIORITY | -1 | 8 | 4 | 7 | 8 | 3 | 8 | 0 | 4 | 8 | 1 |
| TYPE  22 | 0 | 1 | 0 | 0 | 1 | 0 | 1 | 5 | 0 | 2 | 4 |
| NUMBER | 8 | 1 | 3 | 5 | 2 | 2 | 3 | 6 | 3 | 1 | 9 |
| NAME | "!" | "a" | "*" | "(" | "b" | "-" | "c" | ")" | "*" | "3" | "#" |

CONSTANT VALUE ARRAY

16 — | 3.0 | | | | | | | | | | |

INDEPENDENT VALUE ARRAY   21

EVALUATION MATRIX (19, 88)

| ROW | | | | | | | | | | | |
|---|---|---|---|---|---|---|---|---|---|---|---|
| 12 | | | | | | | | | | | |
| ... | | | | | | | | | | | |
| 6 | | | | | | | | | | | |
| 5 | | | | | | | | | | | |
| 4 | | | | | | | | | | | |
| 3 | | | | | | | | | | | |
| 2 | | | | | | | | | | | |
| 1 | | | | | | | | | | | |
| VALUE | $\frac{\partial}{\partial x_1}$ | $\frac{\partial}{\partial x_2}$ | ... | $\frac{\partial}{\partial x_n}$ | $\frac{\partial^2}{\partial x_1^2}$ | $\frac{\partial^2}{\partial x_1 \partial x_2}$ | ... | $\frac{\partial^2}{\partial x_1 \partial x_n}$ | ... | $\frac{\partial^2}{\partial x_n^2}$ |
| COLUMN: 1 | 2 | 3 | ... | | | | | | | | |

FIG. 9

EVALUATION MATRIX EXAMPLE

FUNCTION: a*(b-c)   a=2, b=3, c=4

| ROW | | | | | | | | | | | |
|---|---|---|---|---|---|---|---|---|---|---|---|
| 12 | | | | | | | | | | | |
| ... | | | | | | | | | | | |
| 6 | | | | | | | | | | | |
| 5 | | | | | | | | | | | |
| 4 | | | | | | | | | | | |
| 3 | 4.0 | 0.0 | 0.0 | 1.0 | 0.0 | 0.0 | 0.0 | 0.0 | 0.0 | 0.0 | ←c |
| 2 | 3.0 | 0.0 | 1.0 | 0.0 | 0.0 | 0.0 | 0.0 | 0.0 | 0.0 | 0.0 | ←b |
| 1 | 2.0 | 1.0 | 0.0 | 0.0 | 0.0 | 0.0 | 0.0 | 0.0 | 0.0 | 0.0 | ←a |
| VALUE | $\frac{\partial}{\partial a}$ | $\frac{\partial}{\partial b}$ | $\frac{\partial}{\partial c}$ | $\frac{\partial^2}{\partial a^2}$ | $\frac{\partial^2}{\partial a \partial b}$ | $\frac{\partial^2}{\partial a \partial c}$ | $\frac{\partial^2}{\partial b^2}$ | $\frac{\partial^2}{\partial b \partial c}$ | $\frac{\partial^2}{\partial c^2}$ | |
| COLUMN 1 | 2 | 3 | 4 | 5 | 6 | 7 | 8 | 9 | 10 | |

$$Y = a * b \qquad \text{—140}$$

$$\frac{\partial Y}{\partial x_1} = \frac{\partial a}{\partial x_1} * b + a * \frac{\partial b}{\partial x_1} \qquad \text{—141}$$

$$\frac{\partial^2 Y}{\partial x_1 \partial x_2} = \frac{\partial^2 a}{\partial x_1 \partial x_2} * b + \frac{\partial a}{\partial x_1} * \frac{\partial b}{\partial x_2} + \frac{\partial a}{\partial x_2} * \frac{\partial b}{\partial x_1} + a * \frac{\partial^2 b}{\partial x_1 \partial x_2} \qquad \text{—142}$$

```
     {r1 - row number for first operand}
     {r2 - row number for second operand}
     {Icount - number of independent variables}
 10  PROCEDURE MULTIPLY;
 20  VAR I,
 30      J,
 40      K:   INTEGER;
 50  BEGIN
 60       Icount1 := Icount + 1;
 70       I := Icount1;
 80       FOR J := 2 TO Icount1 DO
 90       BEGIN
100         FOR K := J TO Icount1 DO
110         BEGIN
120           I := I + 1;
130           Matrix[r2,I] := Matrix[r1,1]*Matrix[r2,I]
140                          +Matrix[r1,I]*Matrix[r2,1]
150                          +Matrix[r1,J]*Matrix[r2,K]
160                          +Matrix[r1,K]*Matrix[r2,J];
170         END;
180       END;
190       FOR J := 2 Icount1 DO
200           Matrix[r2,J] := Matrix[r1,1]*Matrix[r2,J]
210                          +Matrix[r1,J]*Matrix[r2,1]
220       Matrix[r2,1] := Matrix[r2,1]*Matrix[r1,1];
230  END
```

FIG. 14

EVALUATION MATRIX EXAMPLE

FUNCTION: a*(b-c)    a=10, b=6, c=3

| VALUE | $\frac{\partial}{\partial a}$ | $\frac{\partial}{\partial b}$ | $\frac{\partial}{\partial c}$ | $\frac{\partial}{\partial ac}$ | $\frac{\partial^2}{\partial a^2}$ | $\frac{\partial^2}{\partial a\partial b}$ | $\frac{\partial^2}{\partial a\partial c}$ | $\frac{\partial^2}{\partial b^2}$ | $\frac{\partial^2}{\partial b\partial c}$ | $\frac{\partial^2}{\partial c^2}$ | |
|---|---|---|---|---|---|---|---|---|---|---|---|
| 3.0 | 0.0 | 0.0 | 1.0 | 0.0 | 0.0 | 0.0 | 0.0 | 0.0 | 0.0 | →c |
| 6.0 | 0.0 | 1.0 | 0.0 | 0.0 | 0.0 | 0.0 | 0.0 | 0.0 | 0.0 | →b |
| 10.0 | 1.0 | 0.0 | 0.0 | 0.0 | 0.0 | 0.0 | 0.0 | 0.0 | 0.0 | →a |
| | 2 | 3 | 4 | 5 | 6 | 7 | 8 | 9 | 10 | |
| 1 | | | | | | | | | | |

FIG 15A

FUNCTION: a*(b-c)    a=10, b=6, c=3

| VALUE | $\frac{\partial}{\partial a}$ | $\frac{\partial}{\partial b}$ | $\frac{\partial}{\partial c}$ | $\frac{\partial}{\partial ac}$ | $\frac{\partial^2}{\partial a^2}$ | $\frac{\partial^2}{\partial a\partial b}$ | $\frac{\partial^2}{\partial a\partial c}$ | $\frac{\partial^2}{\partial b^2}$ | $\frac{\partial^2}{\partial b\partial c}$ | $\frac{\partial^2}{\partial c^2}$ | |
|---|---|---|---|---|---|---|---|---|---|---|---|
| 3.0 | 0.0 | 1.0 | -1.0 | 0.0 | 0.0 | 0.0 | 0.0 | 0.0 | 0.0 | →(b-c) |
| 10.0 | 1.0 | 0.0 | 0.0 | 0.0 | 0.0 | 0.0 | 0.0 | 0.0 | 0.0 | →a |
| | 2 | 3 | 4 | 5 | 6 | 7 | 8 | 9 | 10 | |
| 1 | | | | | | | | | | |

FIG 15B

FUNCTION: cos(a)+b+c*3   a=1.264, b=3.791, c=2.583

FIG. 16A

| ROW | | | | | | | | | | |
|---|---|---|---|---|---|---|---|---|---|---|
| 1 | 1.264 | 1.000 | 0.000 | 0.000 | 0.000 | 0.000 | 0.000 | 0.000 | 0.000 | 0.000 |
| VALUE | | $\frac{\partial}{\partial a}$ | $\frac{\partial}{\partial b}$ | $\frac{\partial}{\partial c}$ | $\frac{\partial^2}{\partial a^2}$ | $\frac{\partial^2}{\partial a \partial b}$ | $\frac{\partial^2}{\partial a \partial c}$ | $\frac{\partial^2}{\partial b^2}$ | $\frac{\partial^2}{\partial b \partial c}$ | $\frac{\partial^2}{\partial c^2}$ |
| COLUMN | 1 | 2 | 3 | 4 | 5 | 6 | 7 | 8 | 9 | 10 |

| | | | | | | | | | | |
|---|---|---|---|---|---|---|---|---|---|---|
| 1 | 0.302 | -0.953 | 0.000 | 0.000 | -0.302 | 0.000 | 0.000 | 0.000 | 0.000 | 0.000 |
| VALUE | | $\frac{\partial}{\partial a}$ | $\frac{\partial}{\partial b}$ | $\frac{\partial}{\partial c}$ | $\frac{\partial^2}{\partial a^2}$ | $\frac{\partial^2}{\partial a \partial b}$ | $\frac{\partial^2}{\partial a \partial c}$ | $\frac{\partial^2}{\partial b^2}$ | $\frac{\partial^2}{\partial b \partial c}$ | $\frac{\partial^2}{\partial c^2}$ |

→cos(a

FIG. 16C

| | | | | | | | | | | |
|---|---|---|---|---|---|---|---|---|---|---|
| 2 | -3.791 | 0.000 | 1.000 | 0.000 | 0.000 | 0.000 | 0.000 | 0.000 | 0.000 | 0.000 |
| 1 | 0.302 | -0.953 | 0.000 | 0.000 | -0.302 | 0.000 | 0.000 | 0.000 | 0.000 | 0.000 |
| VALUE | | $\frac{\partial}{\partial a}$ | $\frac{\partial}{\partial b}$ | $\frac{\partial}{\partial c}$ | $\frac{\partial^2}{\partial a^2}$ | $\frac{\partial^2}{\partial a \partial b}$ | $\frac{\partial^2}{\partial a \partial c}$ | $\frac{\partial^2}{\partial b^2}$ | $\frac{\partial^2}{\partial b \partial c}$ | $\frac{\partial^2}{\partial c^2}$ |

→b
→cos(a

FIG. 16D

| | | | | | | | | | | |
|---|---|---|---|---|---|---|---|---|---|---|
| 1 | -3.489 | -0.953 | 1.000 | 0.000 | -0.302 | 0.000 | 0.000 | 0.000 | 0.000 | 0.000 |
| VALUE | | $\frac{\partial}{\partial a}$ | $\frac{\partial}{\partial b}$ | $\frac{\partial}{\partial c}$ | $\frac{\partial^2}{\partial a^2}$ | $\frac{\partial^2}{\partial a \partial b}$ | $\frac{\partial^2}{\partial a \partial c}$ | $\frac{\partial^2}{\partial b^2}$ | $\frac{\partial^2}{\partial b \partial c}$ | $\frac{\partial^2}{\partial c^2}$ |

→cos(a

FIG. 16E

| | VALUE | $\frac{\partial}{\partial a}$ | $\frac{\partial}{\partial b}$ | $\frac{\partial}{\partial c}$ | $\frac{\partial^2}{\partial a^2}$ | $\frac{\partial^2}{\partial a \partial b}$ | $\frac{\partial^2}{\partial a \partial c}$ | $\frac{\partial^2}{\partial b^2}$ | $\frac{\partial^2}{\partial b \partial c}$ | $\frac{\partial^2}{\partial c^2}$ | |
|---|---|---|---|---|---|---|---|---|---|---|---|
| 2 | 2.583 | 0.000 | 0.000 | 1.000 | 0.000 | 0.000 | 0.000 | 0.000 | 0.000 | 0.000 | ←c |
| 1 | -3.489 | -0.953 | 1.000 | 0.000 | -0.302 | 0.000 | 0.000 | 0.000 | 0.000 | 0.000 | ←cos(a)+b |

FIG. 16F

| | VALUE | $\frac{\partial}{\partial a}$ | $\frac{\partial}{\partial b}$ | $\frac{\partial}{\partial c}$ | $\frac{\partial^2}{\partial a^2}$ | $\frac{\partial^2}{\partial a \partial b}$ | $\frac{\partial^2}{\partial a \partial c}$ | $\frac{\partial^2}{\partial b^2}$ | $\frac{\partial^2}{\partial b \partial c}$ | $\frac{\partial^2}{\partial c^2}$ | |
|---|---|---|---|---|---|---|---|---|---|---|---|
| 3 | 3.000 | 0.000 | 0.000 | 0.000 | 0.000 | 0.000 | 0.000 | 0.000 | 0.000 | 0.000 | ←3 |
| 2 | 2.583 | 0.000 | 0.000 | 1.000 | 0.000 | 0.000 | 0.000 | 0.000 | 0.000 | 0.000 | ←c |
| 1 | -3.489 | -0.953 | 1.000 | 0.000 | -0.302 | 0.000 | 0.000 | 0.000 | 0.000 | 0.000 | ←cos(a)+b |

FIG. 16G

| | VALUE | $\frac{\partial}{\partial a}$ | $\frac{\partial}{\partial b}$ | $\frac{\partial}{\partial c}$ | $\frac{\partial^2}{\partial a^2}$ | $\frac{\partial^2}{\partial a \partial b}$ | $\frac{\partial^2}{\partial a \partial c}$ | $\frac{\partial^2}{\partial b^2}$ | $\frac{\partial^2}{\partial b \partial c}$ | $\frac{\partial^2}{\partial c^2}$ | |
|---|---|---|---|---|---|---|---|---|---|---|---|
| 2 | 7.749 | 0.000 | 0.000 | 3.000 | 0.000 | 0.000 | 0.000 | 0.000 | 0.000 | 0.000 | ←c*3 |
| 1 | -3.489 | -0.953 | 1.000 | 0.000 | -0.302 | 0.000 | 0.000 | 0.000 | 0.000 | 0.000 | ←cos(a)+b |

FIG. 16H

| | VALUE | $\frac{\partial}{\partial a}$ | $\frac{\partial}{\partial b}$ | $\frac{\partial}{\partial c}$ | $\frac{\partial^2}{\partial a^2}$ | $\frac{\partial^2}{\partial a \partial b}$ | $\frac{\partial^2}{\partial a \partial c}$ | $\frac{\partial^2}{\partial b^2}$ | $\frac{\partial^2}{\partial b \partial c}$ | $\frac{\partial^2}{\partial c^2}$ | |
|---|---|---|---|---|---|---|---|---|---|---|---|
| 1 | 4.260 | -0.953 | 1.000 | 3.000 | -0.302 | 0.000 | 0.000 | 0.000 | 0.000 | 0.000 | ←cos(a)<br>+b+c*3 |

METHOD AND APPARATUS FOR EVALUATING PARTIAL DERIVATIVES

FIELD OF THE INVENTION

The present invention relates to a method and apparatus for the organization and control of a computer memory system, and, more particularly to a method and apparatus which organizes and controls the memory system in such a way as to produce an evaluation of the partial derivatives of a specified function.

BACKGROUND OF THE INVENTION

Partial derivatives are fundamental mathematical operators which are well known and used for describing the concept of change of one or more physical parameters. Typically, a phenomenon under consideration is a function of a number of independent parameters, and thus the dynamic description of this function with respect to a particular parameter evolves into expressions requiring the evaluation of partial derivatives.

Numerous physical phenomena may be expressed mathematically with partial derivatives, such as: velocity, acceleration, impulse, insulation, rate of chemical reactions, interest rates, inflation, etc. Partial derivatives are also used extensively for purposes of theoretical modeling in fields such as aerospace, ballistics, mechanical and electrical engineering, econometrics and statistics.

Conventional techniques for the evaluation of partial derivatives generally involve either methods of evaluation by hand, or various approximation techniques. When evaluating partial derivatives by hand, a number of well-known mathematical rules are applied to the given function to produce a number of expressions, one differentiated with respect to each independent variable (or combination of variables). Those differentiated expressions are then evaluated. But as the functions become complex, and the number of independent variables increases, the length of the expressions and the number of the expressions (particularly when higher order derivatives are considered) turn what might seem to be a rather mechanical job into one which is not only time-consuming but highly subject to error.

Approximation techniques for the evaluation of partial derivatives may be realized through the use of a digital computer. By their very nature, these approximation techniques involve a systematic error, due to two facts, first, that the evaluation of the partial derivatives is not done at precisely the point specified by the values of the independent variables, rather it is done at points in the near vicinity and, second, that typical functions being evaluated produce approximation errors that are predominantly in the same direction. For example, the Taylor approximation technique for first order derivative involves evaluating the given function at two points separated by a predetermined interval in the vicinity of the point of interest. The values resulting from these evaluations are used to determine the slope of the function between these two points, and this slope is then taken as an approximation for the first order derivative of the function at this point specified by the values of the independent variables. Similar schemes exist for approximation of second order derivatives.

Applications which often use approximation techniques for the evaluation of partial derivatives, such as Kalman filtering techniques, typically involve a repetitive process whereby a series of calculations is performed hundreds, if not thousands of times. Each of these calculations uses several partial derivative values and each incorporates into the process a certain error associated with each approximated value. Typically, these approximation errors are predominantly all in the same direction (i.e. all overestimates or all underestimates) and thus tend to accumulate, resulting in a rather large numerical error in the final results for an application.

Additionally, prior art techniques employing the use of the digital computer have often required relatively extensive hardware in order to evaluate the functions in a desirably short time, or considerable effort on the part of the user to preprocess the function so that its derivative can be evaluated by the computer system.

Thus, the need is shown for a method for evaluating partial derivatives by computer which is fast, accurate and preferably uses a small amount of memory.

It is an object of the present invention to provide a method and means to quickly, efficiently and accurately evaluate partial derivatives of a given function.

In accomplishing that object, the invention provides a method for the organization and control of a computer memory system such that information is manipulated and transferred between cells in an evaluation matrix of that memory system according to predetermined rules which results in the accumulation within the matrix the values of the partial derivatives of a given function evaluated at specified values of its independent variables.

It is a subsidiary object to accomplish the foregoing in a computational device which is readily available and need not be particularly configured to the application. Accordingly, an object is to minimize the memory requirements through an efficient organization of the memory elements, and maximize the speed of the evaluation through efficient manipulations of memory elements, thus enabling a relatively small computational device to perform accurate partial derivative evaluations for complex real time purposes.

The above objects are realized in accordance with the present invention which provides a method and apparatus which results in the automatic evaluation of partial derivatives of a given function at specified values; the evaluations is completed very quickly, uses a relatively small amount of memory, and is extremely accurate. The invention applies known mathematical rules relating simple functions to their derivatives. The rules are coded into sets of instructions which simply and efficiently manipulate information derived from complex functions which information has previously been arranged in a specific manner in an evaluation matrix. Each operator within any given function is assigned a priority and the relative priorities, along with the derivative rules, control the loading, unloading and manipulation of information in particular cells of the evaluation matrix to ultimately arrive at evaluated partial derivatives of the specified function. Through the use of this matrix, the number of manipulations required to perform the evaluation is substantially minimized, thereby also substantially minimizing the number of numerical errors introduced into the final evaluations.

BRIEF DESCRIPTION OF THE DRAWINGS

These and other objects of the present invention will become apparent from the description below when taken in conjunction with the following drawings in which:

FIG. 2 is a schematic diagram of various memory arrays used by the invention;

FIG. 8 is a diagram showing the general structure of the evaluation matrix which is an element of the present invention;

FIG. 9 is a diagram showing the structure and arrangement of elements of the evaluation matrix in conjunction with an example;

FIG. 14 shows the various rules and an implementation of the instructions for a multiplication subroutine for the evaluator.

FIGS. 15A and 15B show the arrangement of values of various elements in the evaluation matrix during two steps of an example evaluation;

FIGS. 16A–16H show the values of the elements, and the configuration of the evaluation matrix during the steps involved in the example evaluation of the functions "cos (a)+b+c*3".

Figure 1:
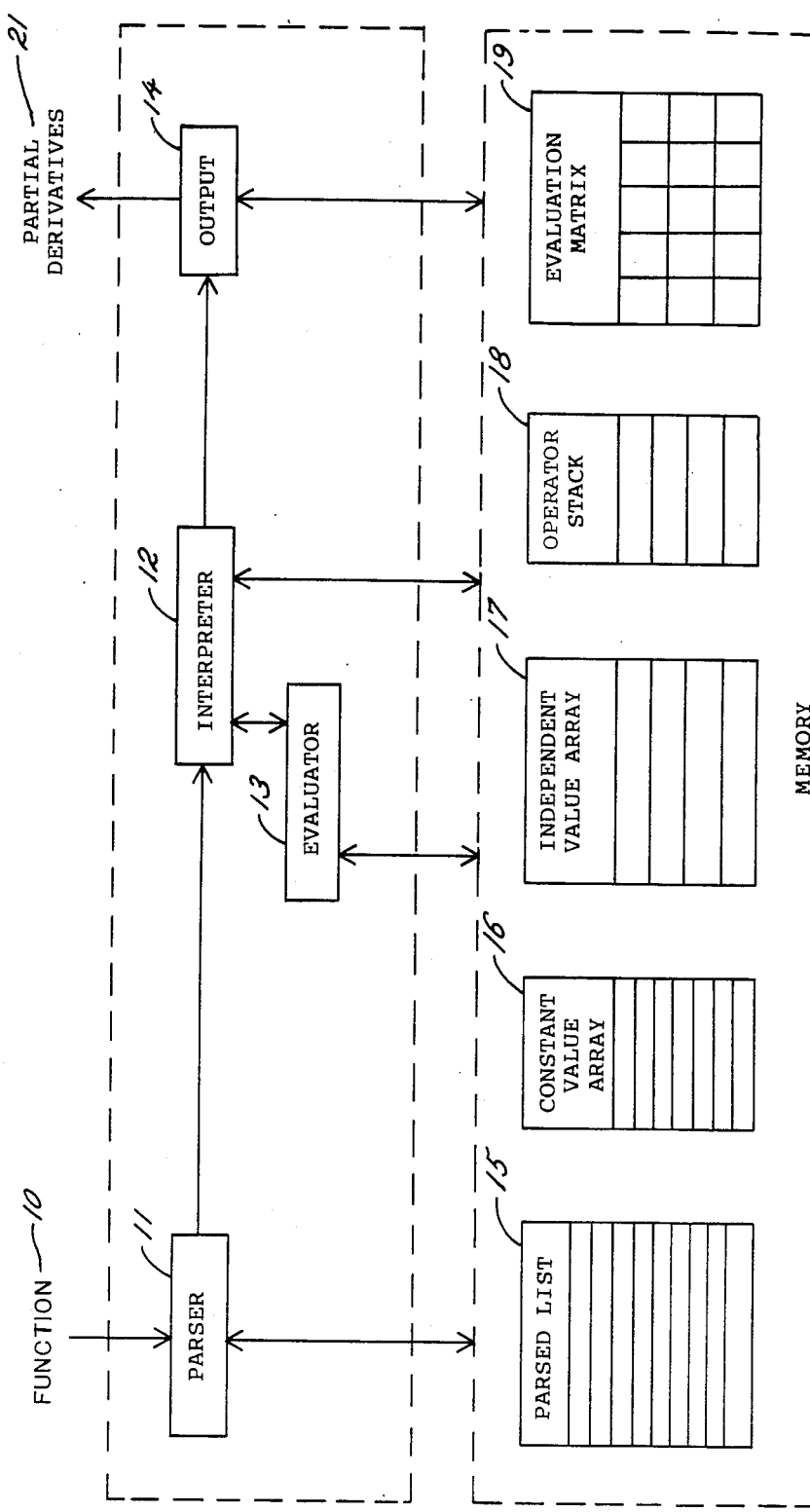
FIG. 1 is a schematic block diagram depicting the major components of a preferred embodiment of the invention.

While the invention will be described in connection with certain preferred embodiments and examples, it should be understood that it is not intended to limit the invention to those particular embodiments and examples. On the contrary, it is intended to cover all alternaives, modifications and equivalents falling within the spirit and scope of the invention as defined by the appended claims.

DETAILED DESCRIPTION OF THE INVENTION

The present invention provides a method and means for the evaluation of the partial derivatives of a given function, which may be easily implemented on a relatively simple digital computer such as an IBM Personal Computer or similar device. The invention performs its functions by organizing and controlling the memory system of the computer to create an evaluation matrix within that system, then to manipulate information within that matrix as defined below. Preferably the given function is presented to the computer as a sequence of characters representing the function, and the specified values of independent variables at which the partial derivatives are to be evaluated may be entered in a similar manner. The invention may be implemented in a large and powerful computer system as well, or in a special purpose hardware processor, but it is not limited to any system.

The function whose partial derivatives are to be evaluated may be conceptualized or composed of a number of "elements." An element is roughly defined herein as a discrete part of the function such as a single variable or a single operator. Elements are often a single character (e.g., "+"), but can also be character strings e.g. ("8.354" or "SIN"). Elements include constants (i.e. fixed numbers), variables, operands (constants and independent variables), operators (elements specifying a particular mathematical operation to be performed on a single variable such as "SIN" or "ABS"), and separators (elements which are operators (such as "+", "−", "*", "/") or other logical grouping elements (such as "(", ")"). The manner in which the elements are manipulated will be described below.

An important aspect regarding the efficiency of the system and its associated method lies in the specific organization of various memory elements. The function which is input by the user is divided into its individual elements by a parser which creates a parsed list containing not only the elements but als priorities uniquely assigned to the elements by the parser. The elements within the parsed list are then scanned in sequence, while the assigned priorities are reviewed. Elements from the parsed list can be routed to a constant value array, an independent value array, an operator stack, or an evaluation matrix within the defined memory system dependent upon the nature of the element then being scanned and its priorities relative to others within the array. The memory and the rules which control it ultimately serve to store and manipulate the information within the evaluation matrix resulting in a stored array which represents the partial derivatives of the specified function evaluated at the specified values of the independent variables.

Turning now to FIG. 1, there is shown a schematic block diagram depicting the major processing components of a preferred embodiment of the present invention, which is shown to include: a parser 11, an interpreter 12, an evaluator 13, an output module 14, and the memory system 20. The parser 11 breaks down and stores in the memory 20, along with various codes, individual elements of the function 10. The interpreter 12 then analyzes these elements and their associated codes to determine a sequence for manipulating information. Individual manipulators are carried out by the evaluator 13 which uses the various equation elements and values to determine intermediate and final partial derivative values. After the interpreter 12 has sequenced through all the elements of the equation 10, and the evaluator 13 has completed all the necessary manipulations requested by the interpreter, then the output module 14 is called. The output module 14 outputs the various partial derivatives which have been evaluated, either in a format for display or in any other specified format.

The memory system 20 of the invention is configured into several organized units, and stores values and information used by the parser 11, interpreter 12, evaluator 13 and output module 14. The individual memory units include a parsed list 15 which is assembled by the parser 11 from the information contained in the given function 10. The parser 11 also generates a constant value array 16 and an independent value array 17 from the information relating to the constant and independent variables present in the given function 10. The interpreter 12 then uses the information stored in the parsed list 15 to assemble and manipulate information in the operator stack 18 and the evaluation matrix 19. The general purpose of the operator stack 18 is to assist the interpreter 12 in determining the sequence of manipulations to be performed on the evaluation matrix 19. The evaluation matrix 19, on the other hand, provides organized storage of the various values relating to the partial derivaties and facilitates the manipulation of these values to result in the evaluation of the partial derivatives of the given function 19. The evaluator 13 does the actual manipulation of the information in the evaluation matrix 19 in accordance with stored instruction sets. The instruction sets are related to well known rules for analytical evaluation of partial derivatives, such as those published in *Calculus With Analytical Geometry* by E. Swokowski (2nd edition, 1979), particularly chapter 16. The rules are implemented in the evaluation in terms of instructions which cause the manipulations of the data in particular locations in the evaluations matrix as required by the particular rule associated with any given operator. The output module 14 then uses the results of the manipulations which are stored in the evaluation matrix 19 to generate an output corresponding to the partial derivatives 21 of the given function 10.

Turning now to FIG. 2, there is a schematic diagram of various memory arrays shown in conjunction with the example function "a*(b−c)*3". The function array 87 typically consists of a string of characters representing the given function. The parser parses this function array 87, partitioning it into its individual function elements such as operators, independent variables, constant and separators. Operators typically consist of a number of sets of predetermined character sequences such as 'SIN', 'COS' or 'ABS', each denoting a particular mathematical function. Independent variables are recognized as a set of one or more alphanumeric characters which represent the individual independent variable names. Constants are recognized as a string of numeric digits and an optional decimal point. Separators typically consist of single characters representing one of several common mathematical operators such as '+', '−', '*', '/', '(' or ')'.

These individual function elements are stored in a parsed list 15 along with priority, type and number codes. The parses list is preferably organized as a matrix 15 in which the column members 21 designate individual function elements and the row members 22 designate the different codes associated with each element. Alternatively, of course, the row members 22 may be used to designate individual function elements and the column members 21 designate the associated codes. As will be described in more detail later, the priority and type codes are assigned by the parser in a predetermined fashion. For example, the function element "*" which designates the multiplication function, will be assigned a priority code associated with this particular element. Similarly, a type code is assigned to each element and gives a more general indication as to the type of function element it represents. The type codes are all predetermined for each particular function element and the parser uses these predetermined codes to assign and store the codes for the corresponding function elements present in the given function 10. The number code is used to designate the general position of a particular function element with respect to function elements with the same type codes, or in some instances it is used to further define the function element. As may be seen from FIG. 2, the parser also inserts special elements '!' and '#', denoting the beginning and ending of the function, respectively.

In order to store the values of the constants and independent variables, there are provided the CONSTANT VALUE ARRAY 16 and the INDEPENDENT VALUE ARRAY 17. These two numeric arrays contain the numeric values of the constants and independent variables for use during evaluation procedures. The CONSTANT VALUE ARRAY 16 is used to store the numeric value of any constants found in the function. Likewise, the INDEPENDENT VALUE ARRAY 17 is used to store the numeric value of the independent variables, input by the user, at which the partial derivatives are to be evaluated.

Turning back for a moment to FIG. 1, operation of the present invention is started with a function 10 being presented to the parser 11. Typically, the function 10 contains one or more independent variables, the values of which may be passed to the parser 11 with the function 10 initially, or else during the parsing procedure the parser 11 may generate prompts requesting the values of the independent variables to be entered.

The parser analyzes the various function array elements and assigns and stores in the parsed list a priority code, a type code, a number code and the string representing the function element. The priority code is used by the interpreter to determine the proper order in which to carry out various manipulations so as to assure that the proper mathematical rules are followed. The type code is used to indicate the general type of each element. Several different type codes are being used in the present embodiment of the invention. The number code is typically used either to indicate the general position of an element in the function or to uniquely identify the particular element.

For example, the first independent variable encountered in the function will be assigned a number code of "1", the second independent variable will be assigned a number code of "2", etc. Likewise, the first constant encountered in the function will be assigned a number code of "1", the second constant will be assigned a number code of "2", etc. However, for the case of separators and operators, these elements are assigned a number code which is used to uniquely distinguish them from one another. A separator function element designating addition will be assigned a unique number code, which differs from a number code used to designate subtraction or multiplication. The same technique of using unique number codes are used for the operator function elements. The present embodiment of the invention also uses a special type code to indicate the beginning and ending of a function. Two special elements are used for this purpose of indicating the beginning and ending of the function. These special elements are generated by the parser and are distinguished from one another by the use of a unique number code for each.

The priority codes serve as a key to the sequence of manipulations which will eventually be carried out in the evaluation matrix. During the operation of the interpreter, the priority codes for the elements are compared, and this relative comparison results in the determination as to whether a particular manipulation of the information in the evaluation matrix should be carried out at the present time in the process, or the particular manipulation should be done at a later stage in the process. A table of the various function elements, priority codes, type codes, number codes and other related information is provided for convenience in the table in Appendix I. The entry "7/0" for the priority code of "(" means that the parser assigns a priority code of 7 to "(" in the parsed list, but the priority 0 is reassigned to that element when it is transferred to the operator stack.

The manner in which these elements interact will become more apparent in connection with the following examples describing information flow which occurs when evaluating particular functions. However, to summarize, the function, upon being presented to the system, is parsed. The individual elements are sequentially stored in the parsed list along with codes, including priority codes, which are assigned to each element by the parser. the interpreter then sequentially scans the elements in the parsed list to cause the evaluation of the partial derivatives. The interpreter can route information to the operator stack or the evaluation matrix, dependent on associated identification codes, or alternatively can interrupt the routing and call the evaluator to operate on information in the evaluation matrix. In the exemplary embodiment, when the priority of the next item in the parsed list is greater than the priority of the operator at the top of the operator stack, the information in the parsed list is routed, according to its identification code, to either the evaluation matrix or the operator stack. However, when the priority of the next item in the parsed list is less than or equal to the priority of the top item in the operator stack, the evaluator is called. The evaluator manipulates the information stored in at least the top row of the evaluation matrix according to the particular rule which is associated with the operator stored in the top row of the operator stack. With those broad principles in mind, attention will be directed to the manner in which information is manipulated in connection with evaluating partial derivatives of particular functions.

Figure 3:
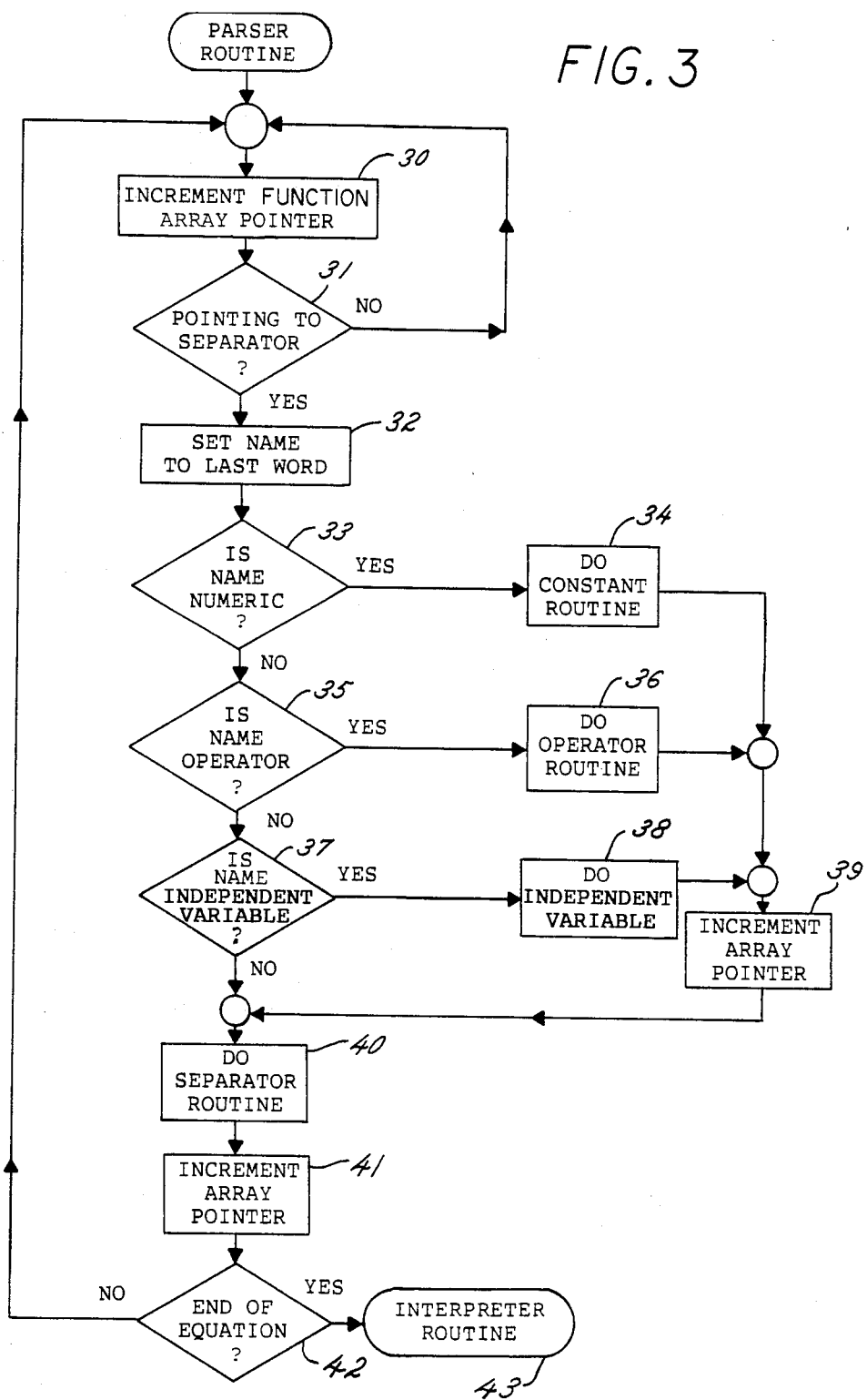
FIG. 3 is a flow chart representation of the PARSER ROUTINE of the present invention.

Attention will now be described to a description of the sequence of operations by which the elements of FIG. 1 perform their assigned functions and interact with each other in accomplishing the objects of the invention. Turning now to FIG. 3, there is shown a flow chart representation of the PARSER ROUTINE of the present invention. The PARSER ROUTINE initially begins with step 30 where a function array pointer is incremented, resulting in the pointer pointing to the first function element in the function array. Step 31 determines whether the current element in the function array is a separator, if it is a separator then the procedure continues to step 32, otherwise the procedure loops back to step 30 and examines the next element in the function array. In step 32, the 'name' variable of the current parsed list array element is set to the last word encountered in the function. The last word is typically the string of characters which occurred after the last, and before the current separator element. The last word is either a constant, operator, independent variable or, in the case where two separator elements have been placed adjacent to one another, the last word is of length zero or null. Next, in step 33, if the 'name' variable is numeric, then it is a constant and the CONSTANT ROUTINE (FIG. 4) is done and the procedure continues to step 39, otherwise the procedure goes to step 35. In step 35, if the 'name' variable is an operator, then the OPERATOR ROUTINE (FIG. 5) is done and the procedure continues to step 39, otherwise the procedure goes to step 37. In step 37, if the 'name' variable is an independent variable, then the INDEPENDENT VARIABLE ROUTINE (FIG. 6) is done and the procedure continues with step 39 which increments the parsed light array pointer and goes to step 40, otherwise two adjacent separators have been encountered and the procedure goes directly to step 40. In step 40, the SEPARATOR ROUTINE (FIG. 7) is done and the current separator element is added to the parsed list. Next, in step 41 the parsed list array pointer is incremented again in preparation for a new function element. Step 42 then checks to see if all the elements of the function have been parsed, if they have, then the end of the function is encountered and control of the procedure is passed to the interpreter after step 42. If all of the function elements have not been encountered yet, then the procedure loops back to step 30 and the next function element is examined.

Figure 4:
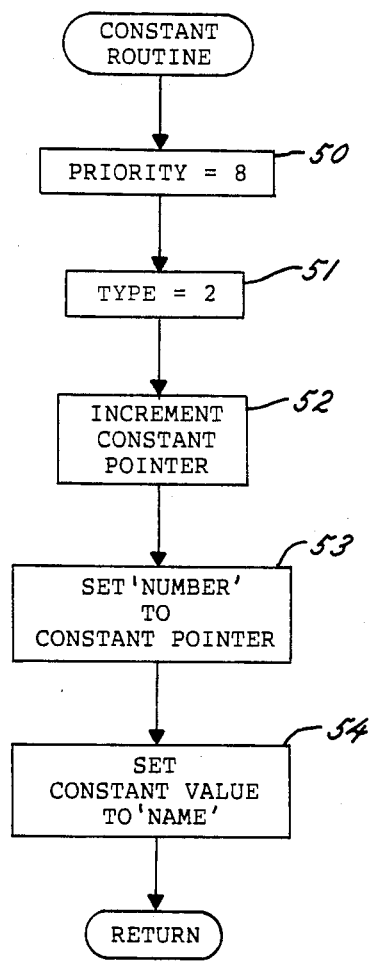
FIG. 4 is a flow chart representation of the CONSTANT ROUTINE used by the parser.

The CONSTANT ROUTINE as shown in FIG. 4, is called by the parser when a constant is encountered in the function. This routine assigns the various parsed list codes for the constant and places their value in the constant value array. The CONSTANT ROUTINE begins in step 50 by assigning a priority code of '8' to the constant element in the parsed list array. Similarly, in step 51 the current parsed list element, which refers to the constant, is assigned to type code of '2'. Next, in step 52, the constant value array pointer is incremented in preparation for the constant. Next, in step 53, the 'number' variable for the current parsed list element is set to the value of the constant value array pointer, and in step 54 the constant value array element is assigned the value of the 'name' variable from the parsed list. Typically, the parsed list name variable is stored in character format while the corresponding constant value array variable is stored in numeric format and is used during the evaluation process. After the CONSTANT ROUTINE has completed step 54, control of the procedure is returned back to the PARSER ROUTINE.

Figure 5:
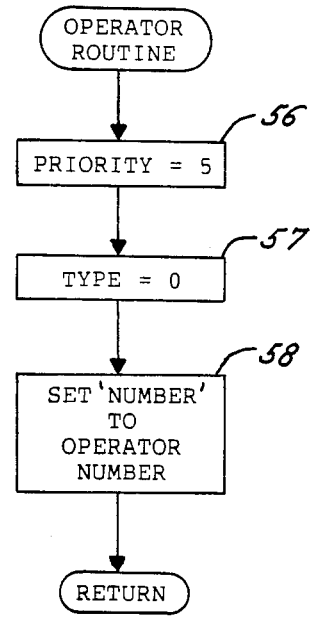
FIG. 5 is a flow chart representation of the OPERATOR ROUTINE used by the parser.

The OPERATOR ROUTINE as shown in FIG. 5, is called by the parser when an operator is encountered in the function, and assigns the various parsed list codes for the current parsed list element, which corresponds to the operator encountered. The OPERATOR ROUTINE begins at step 56 with the current parsed list element priority code beng set to "5". Next, in step 57 the type code is set to "0". Then in step 58 the "number" variable of the current parsed list element is set to the operator number corresponding to the current operator which has been encountered. The OPERATOR ROUTINE is now complete and control of the procedure is passed back to the PARSER ROUTINE.

Figure 6:
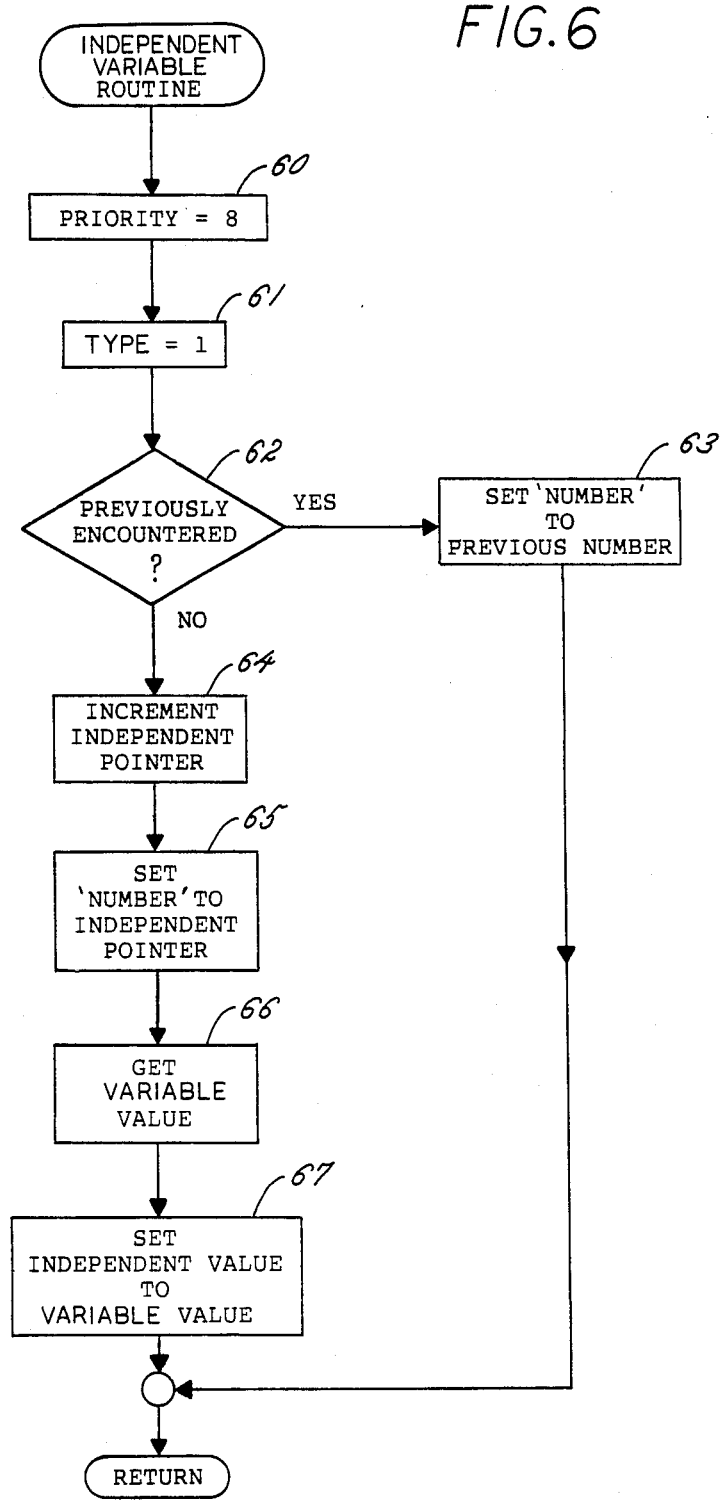
FIG. 6 is a flow chart representation of the INDEPENDENT VARIABLE ROUTINE used by the parser.

Turning now to FIG. 6, there is shown the INDEPENDENT VARIABLE ROUTINE which is called by the parser when an independent variable is encountered in the function. This routine assigns and stores the various parsed list codes corresponding to the independent variable, and also stores the corresponding numeric value of the independent variable in the independent value array. Starting in step 60, the priority code is set to "8", and then the type code is set to "1" in step 61. Next, in step 62, if this particular independent variable has already been encountered in the equation, for example the second occurrence of "a" in "a+b+cos (a)", then the procedure goes to step 63 where the "number" variable is set to the same value of the "number" variable for the previously encountered independent variable, and control of the procedure is returned to the parser. Otherwise, in in step 62 the independent variable has not been previously encountered, then the procedure continues to step 64. In step 64 the independent value array pointer is incremented to prepare for the independent variable value. Next, in step 65, the "number" variable of the current parsed list element is set to the value of the current independent value array pointer. In step 66, the independent variable value is obtained, either from this value having been entered initially with the equation or entered by a user in response to an appropriate prompt. Next, in step 67 the independent value for the element currently being referred to by the independent value array pointer, is set to the value of the independent variable. Finally, after completion of step 67, the INDEPENDENT VARIABLE ROUTINE is finished and control of the procedure is returned back to the PARSER ROUTINE.

Figure 7:
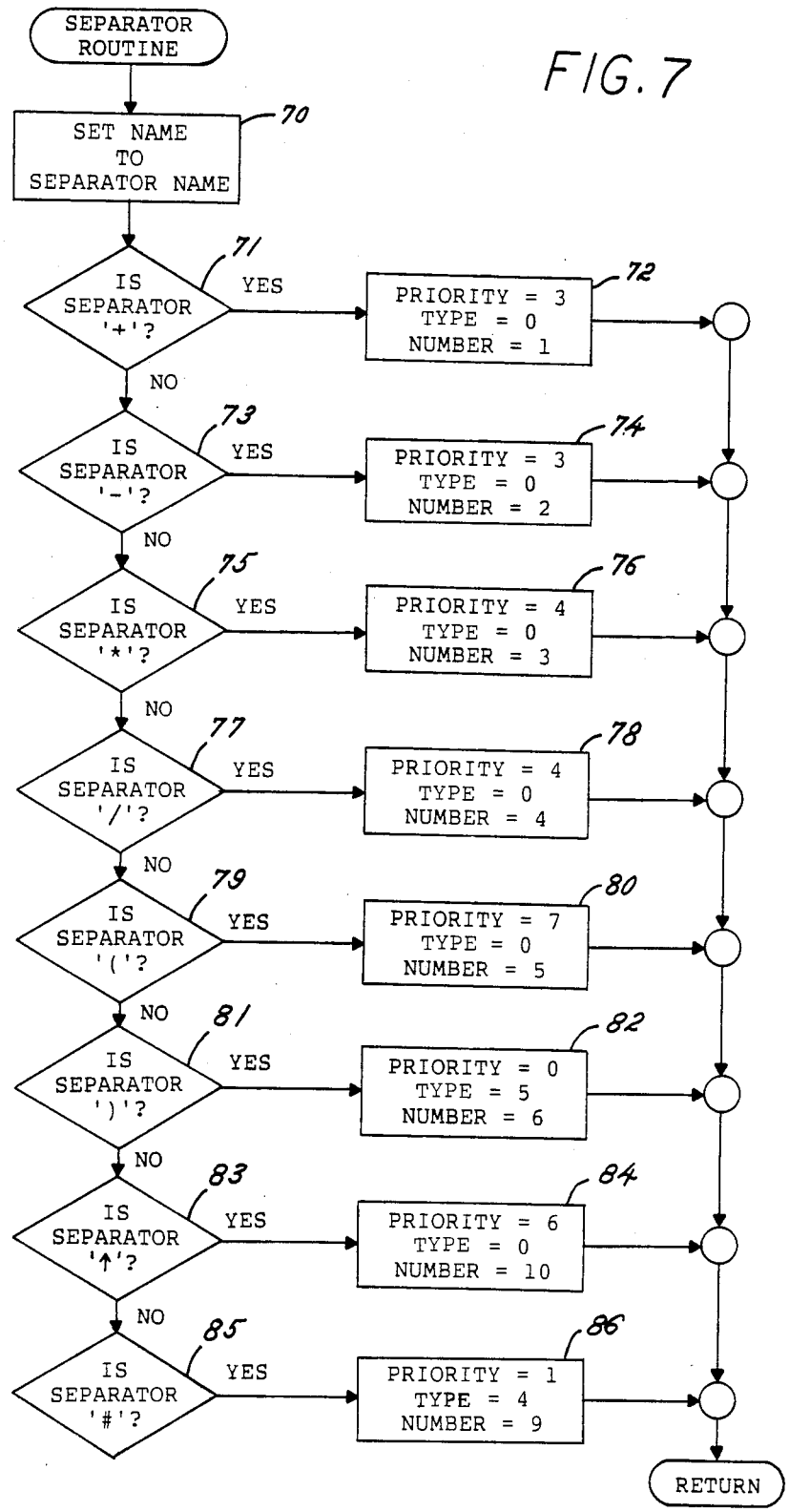
FIG. 7 is a flow chart representation of the SEPARATOR ROUTINE used by the parser.

Turning now to FIG. 7, there is shown a flow chart representation of the SEPARATOR ROUTINE called by the parser when a separator element is encountered in the given function. The routine begins in step 70 by setting the variable NAME of the current parsed list array element to the particular separator name, such as '+', '−', '*', etc. Next, starting with step 71, the routine begins a sequence of steps in order to determine the particular type of separator element that was encountered. In step 71, if the separator was '+', then the varius codes for addition are set in the parsed list in step 72, then control of the procedure is returned back to the parser. Otherwise, if the separator was not '+', then in step 73 it is checked to see if it is '−'. If the separator is '−', then the corresponding priority, type and number codes denoting subtraction are set in step 74, then control of the procedure returns back to the parser. If in step 73 the separator element was not '−', then more checks are done on this element in the other steps of the routine in order to determine which separator element was encountered in the function. When the separator element has been determined, then the corresponding codes are set in the next step, and control of the procedure is passed back to the parser.

After the parser 11 has completed its task of breaking down and storing the elements of the equation into the parsed list 15, control of the procedure is passed to the interpreter 12.

Turning now to FIG. 8, there is shown the evaluation matrix 19 used by the interpreter and evaluator. The evaluation matrix 19 is comprised of a number of rows 89 containing information relating to the partial derivatives of various expressions used to complete the evaluation, and a number of columns 88 containing information relating to the partial derivative with respect to a particular independent variable or combination of independent variables. Information in the cells of the matrix is manipulated by the evaluator such that the value of each partial derivative with respect to each of the independent variables or combination of independent variables is built up in the assigned columns, ultimately resulting in the storage in each column of the evaluation matrix the value of the partial derivatives of the given function with respect to the independent variables. This evaluation matrix 19 provides an organized and efficient means in which are performed the manipulations specified by the interpreter and executed by the evaluator. As can be seen in FIG. 8, the columns 88 of this matrix are used to store a series of values corresponding to the partial derivatives of the associated row members 89 with respect to the particular combination of independent variables designated by the columns. Correspondingly, the rows 89 of this matrix contain information relating to various expressions involving the independent variables or constants. In the first instance, an expression for a particular row will consist of just a single independent variable or a single constant, and later can change to an expression involving the combination of a number of independent variables and/or constants. The individual cells of the matrix contain the value of the partial derivative of the expression designating the associated row with respect to the combination of independent variables designating the associated column. In the present embodiment, the first column of the matrix contains the values relating to the row expressions evaluated at the specified values of the independent variables. The second and following columns then relate to various partial derivatives, preferably in increasing order of degree.

The organization of this matrix will become more apparent through the example of FIG. 9. This example depicts the evaluation matrix at an advanced stage of the evaluation process where the original given function which led to this particular configuration of the matrix is "a*(b−c)." In this example, the values of the independent variables "a", "b", and "c" as specified by the user are, respectively, "2", "3" and "4". As can be seen, at this particular point in the evaluation process, the first row corresponds to the independent variable "a", the second row corresponds to the independent variable "b", and the third row corresponds to the independent variable "c". The first column of the evaluation matrix preferably contains the value of the row expressions evaluated at the specified values of the independent variables. In this example, these values simply correspond to the specified values of the independent variables themselves. The second column corresponds to the first partial derivatives with respect to the first independent variable encountered in the function. Similarly, the third column corresponds to the first partial derivatives with respect to the second independent variable encountered in the function, if it exists. The columns continue in this fashion until each independent variable has its own corresponding column. The following columns correspond to the second partial derivatives with respect to the various combinations of the independent variables as can be sen in FIG. 9. After the columns corresponding to the second partial derivatives, there may follow columns corresponding to third and higher order partial derivatives organized in a similar manner. The present embodiment contains only columns up to and including the second partial derivatives.

An important function of the interpreter 12 is to control the order in which the evaluation steps are completed. The interpreter 12 begins operation by consecutively examining the elements from the parsed list 15 along with their associated priority codes. From the priorities, the interpreter 12 determines whether an evaluation should be made for a part of the expression it has already examined. If the priorities are such that it would not be proper for an evaluation to be made yet, then the interpreter 12 stores the current function elements, or references to these elements on the operator stack 18 or in the evaluation matrix 19 so as to allow easy and organized access to these elements when it is determined that an evaluation should be made.

The interpreter 12 works in conjunction with the evaluator 13. When the interpreter 12 determines from its comparison of priority codes that an evaluation is to be performed, it passes control to the evaluator 13, along with references to function elements which have been stacked by the interpreter 12 and an indication as to the type of operator involved in the derivative evaluation (i.e. addition, multiplication, sine function etc.). The evaluator 13 performs the derivative operations specified by the particular operator by manipulating the values in various cells of the evaluation matrix. After the specified operation has been performed, then the evaluator 13 returns control back to the interpreter 12. The interpreter 12 and evaluator 13 continue this procedure until all the elements of the function have been read and all the required computations have been completed by the evaluator. Control is then passed to an output module 14 and the results of all the calculated partial derivatives 21 are output. This output can be in the form of a video display, storage on a magnetic medium, or a printout which represents the respective values of the partial derivatives evaluated at the points specified by the user. As will be described in greater detail later, the parser 11, interpreter 12 and evaluator 13 work together to provide a system for the evaluation of partial derivatives which is memory-efficient (i.e. uses a relatively small amount of memory), requires a relatively few number of manipulations to evaluate the derivatives, is extremely accurate, and additionally, completes evaluations very quickly.

After the parser 11 has parsed through the function 10, assigned the various codes and priorities to the elements, and assembled and stored this information in the parsed list, then control is turned over to the interpreter 12. At this point, the number of independent variables present in the function is known, and the number of columns in the evaluation matrix needed to determine the desired partial derivatives is determined. Additionally, the maximum number of rows in the evaluation matrix needed to complete the evaluation may also be determined, although the maximum number of rows is seldom needed because of the intermittent calling of the evaluator in response to comparison of priority codes. In a preferred embodiment of the invention, the memory space required for the evaluation matrix may be allocated dynamically, this can be on a row by row basis, selectively allocating a row each time a new row is required, and also freeing old rows when the information they contain is no longer of any use in the evaluation. This embodiment which employs memory allocation of the evaluation matrix on a row basis optimizes the memory such that essentially only the minimum amount of memory required for the evaluation matrix is used at any time.

Returning to the present embodiment of the invention, the interpreter begins examining the elements of the parsed list sequentially, beginning with the first element of the list. If the element being examined is an operator or separator, as can be determined from its type code, then a reference to this element, such as a pointer, is pushed onto an operator stack 18. If the element being examined is an independent variable or constant then the required information about this element is entered in the next consecutive or highest row of the evaluation matrix. For example, in the case of a constant, a new row is added to the matrix and the value of the constant is entered into the first column, and all the other columns corresponding to the various partial derivatives are filled with zeros since the derivative of any constant is zero. The same procedure is done for an independent variable except that the column designating the partial derivative with respect to that particular independent variable is set to one, since the derivative of any variable with respect to itself is one.

Next, the interpreter compares the priority of the current element in the parsed list to the priority of the element at the top of the operator stack. If the priority of the parsed list element is greater than the priority of the operator stack element, then the interpreter will continue on to the next element in the parsed list. Otherwise, if the priority of the parsed list element is less than or equal to the priority of the element at the top of the operator stack, then the operation designated by the operator located at the top of the operator stack should now be performed. At this point the operator is popped off the operator stack. If the operation requires one operand (such as COS, SIN, ABS, etc.), then the evaluator is called and applies the coded rule pertaining to this operator to the information stored in the top row of the evaluation matrix. In this case the results of the operation are stored back in the same top row of the evaluation matrix. If the operation requires two operands (operations such as '+', '−', '/' or '*'), then the evaluator is called and, by using a series of instructions corresponding to the rules governing the particular operation, it manipulates the cells found in the top two rows of the evaluation matrix. The results of a two-operand operation are stored back in the cells in the second from the top row of the evaluation matrix, and the number of rows in the matrix is reduced by one, thereby releasing the former top row of the matrix. Since the operation involving this former top row expression has been completed, the information in this row is no longer needed.

Figure 10:
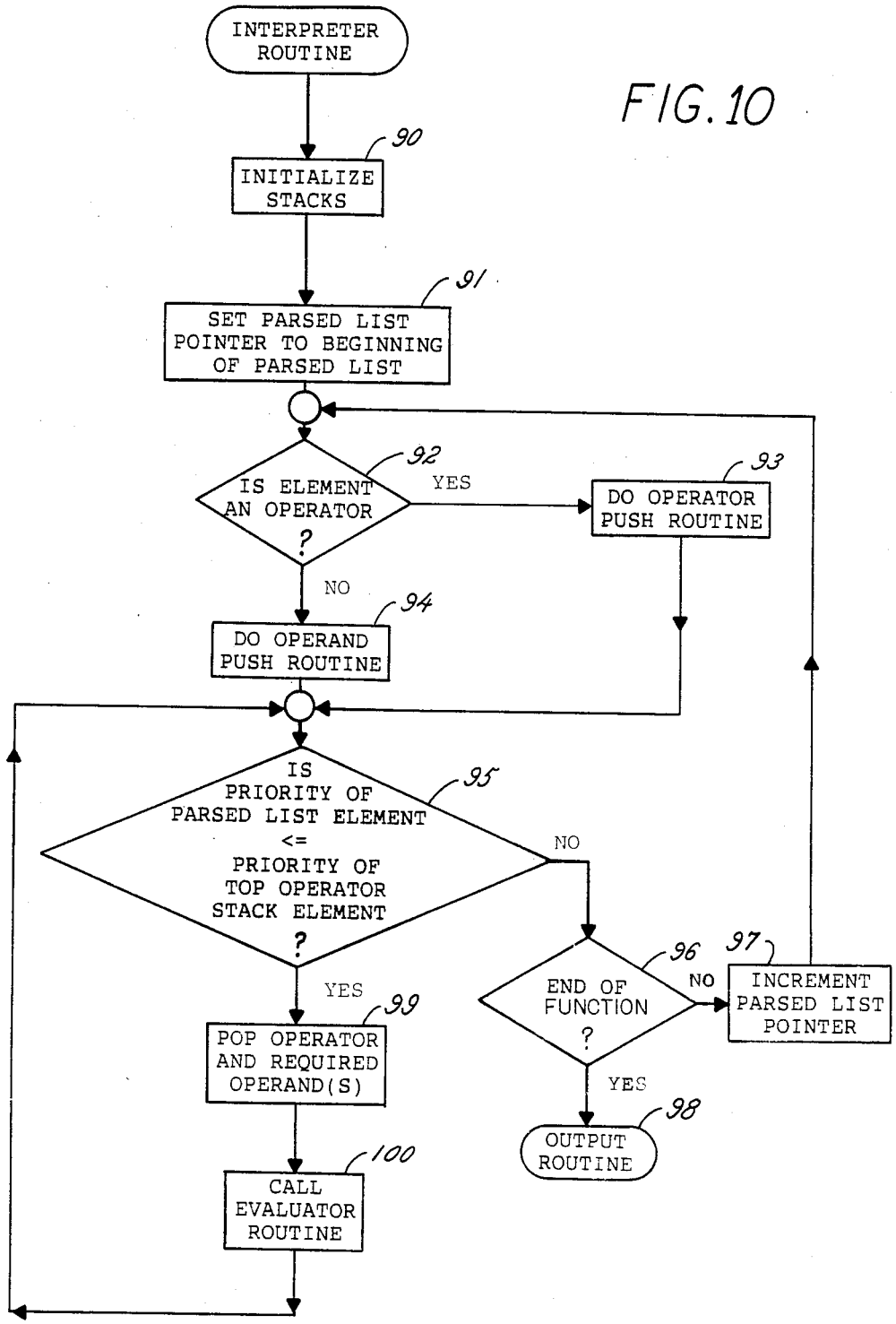
FIG. 10 is a flow chart representation of the INTERPRETER ROUTINE of the present invention.

Turning now to FIG. 10, there is shown a flow chart representation of the routine executed by the interpreter. In step 90, the operator stack, evaluation matrix and variables are initialized. Next in step 91, the parsed list array pointer is set to point to the first element in the parsed list. In step 92, if the current parsed list element is an operator, then the procedure continues to step 93 and the OPERATOR PUSH routine (FIG. 11) is done. Otherwise, if the current parsed list element is not an operator, then the procedure goes to step 94 and the OPERAND PUSH (FIG. 12) routine is done. After either the OPERATOR PUSH or OPERAND PUSH routine is done, then the procedure continues to step 95. In step 95, if the priority of the current parsed list element is less than or equal to the priority of the element on the top of the operator stack, then the procedure goes to step 99, otherwise the procedure goes to step 96. In step 99, the operator element at the top of the operator stack is popped. Also in step 99, the references to the required operands from the evaluation matrix are determined. If the operation requires only one operand, then only the top row of the evaluation matrix is used. However, if the operator requires two operands, then the top two rows of the evaluation matrix are used. Next, in step 100, the evaluator is called to do the necessary partial derivative evaluations corresponding to the operator and one or more operands. After the evaluation of all the corresponding partial derivatives for the operation have been completed by the evaluator, then the procedure loops back to step 95. If in step 95, the priority of the parsed list array element is greater than the priority of the element on the top of the operator stack, then the procedure goes to step 96 and checks if the end of the function has been reached. If the end of the function has been reached, then control is passed to the OUTPUT ROUTINE in step 98, otherwise in step 97 the parsed list array pointer is incremented to the next element in the parsed list and the procedure loops back to step 92.

Figure 11:
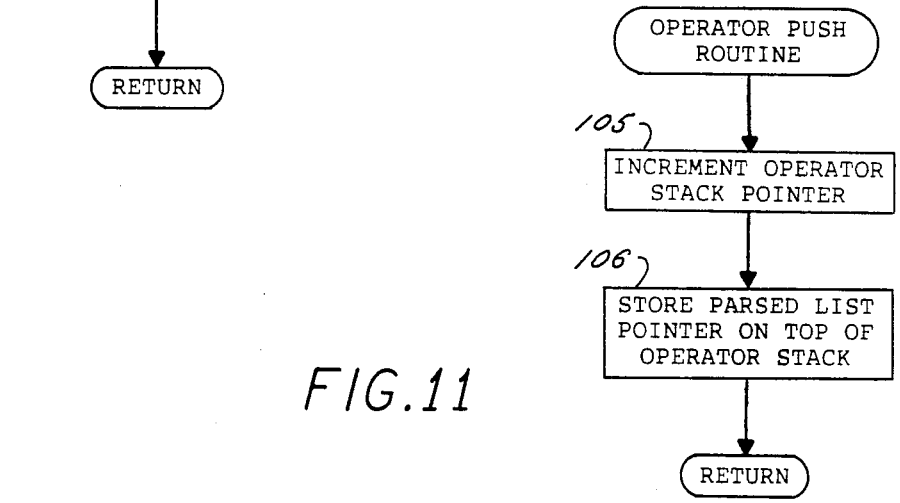
FIG. 11 is a flow chart representation of the OPERATOR PUSH ROUTINE used by the interpreter.

Turning now to FIG. 11, there is shown a flow chart representation of the OPERATOR PUSH routine called by the interpreter when an operator element is encountered in the parsed list. The routine starts in step 105 where the operator stack pointer is incremented in preparation for another operator element being added to the stack. Next in step 106, the parsed list pointer is stored at the top of the operator stack, then control of the procedure is returned back to the interpreter.

Figure 12:
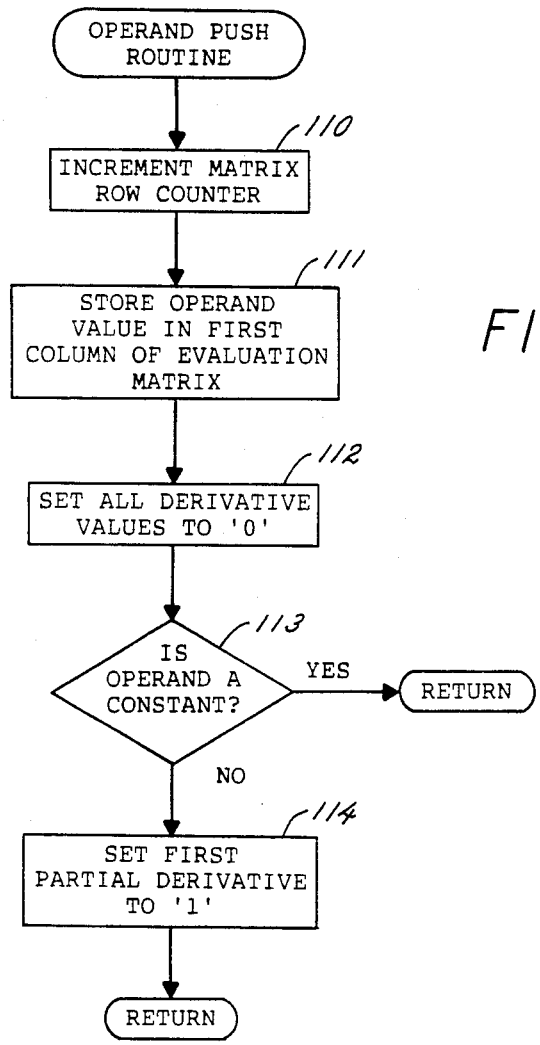
FIG. 12 is a flow chart representation of the OPERAND PUSH ROUTINE used by the interpreter.

A flow chart representation of the OPERAND PUSH routine is shown in FIG. 12. This routine is called by the interpreter when an operand element (an independent variable or a constant) is encountered in the parsed list. The routine begins in step 110 with the matrix row counter being incremented in preparation for a new row being added to the matrix for the operand. Next in step 111, the value of the operand is stored in the first column of this new row of the matrix. If the operand is an independent variable then this value is found in the independent value array, otherwise the operand is a constant and the value is found in the constant value array. Next in step 112, all the derivative columns in this current new row are set to '0'. If in step 113, the operand is not a constant, then it is an independent variable and the partial derivative column corresponding to this variable is set to '1' and control of the procedure is returned to the interpreter. Otherwise, in step 113, the operand is determined to be a constant and control of the procedure is returned directly to the interpreter.

After a matrix manipulation has been performed by the evaluator, the operator stack pointer is adjusted to point to the previous operator stack element, which now occupies the position at the top of the stack. Control is returned to the interpreter after a manipulation and the process is started over again with a comparison of the priority of the current element in the parsed list to the priority of the now top element of the operator stack. Again, if the priority of the current element in the parsed list is greater than the priority of the top element in the operator stack, then the interpreter will continue on to the next element in sequence in the parsed list. This procedure continues until the end of the function has been reached and all the matrix manipulations have been completed, at which time there will be only one row left in the evaluation matrix corresponding to the original equation and all the values of its respective partial derivatives being located in the columns of this single row. Control is then turned over to an output routine which outputs the values of these partial derivatives as desired.

The evaluator of the present invention performs the matrix manipulations for the different operations on the evaluation matrix. It uses a different set of instructions for each of the operations such that given the operation and the operand or operands involved in the operation, the evaluator determines the respective partial derivatives and places these values back into the respective columns in one of the rows of the matrix. These sets of instructions are coded so as to insure the associated mathematical rules pertaining to partial derivatives are properly applied to the values in the evaluation matrix. Care is taken during the execution of these instructions so as not to prematurely erase a value which may be needed later. To this effect, the highest order partial derivatives should be determined first, as the calculations involved in determining these derivatives typically require the use of values which are found in the lower order partial derivatives.

Figure 13:
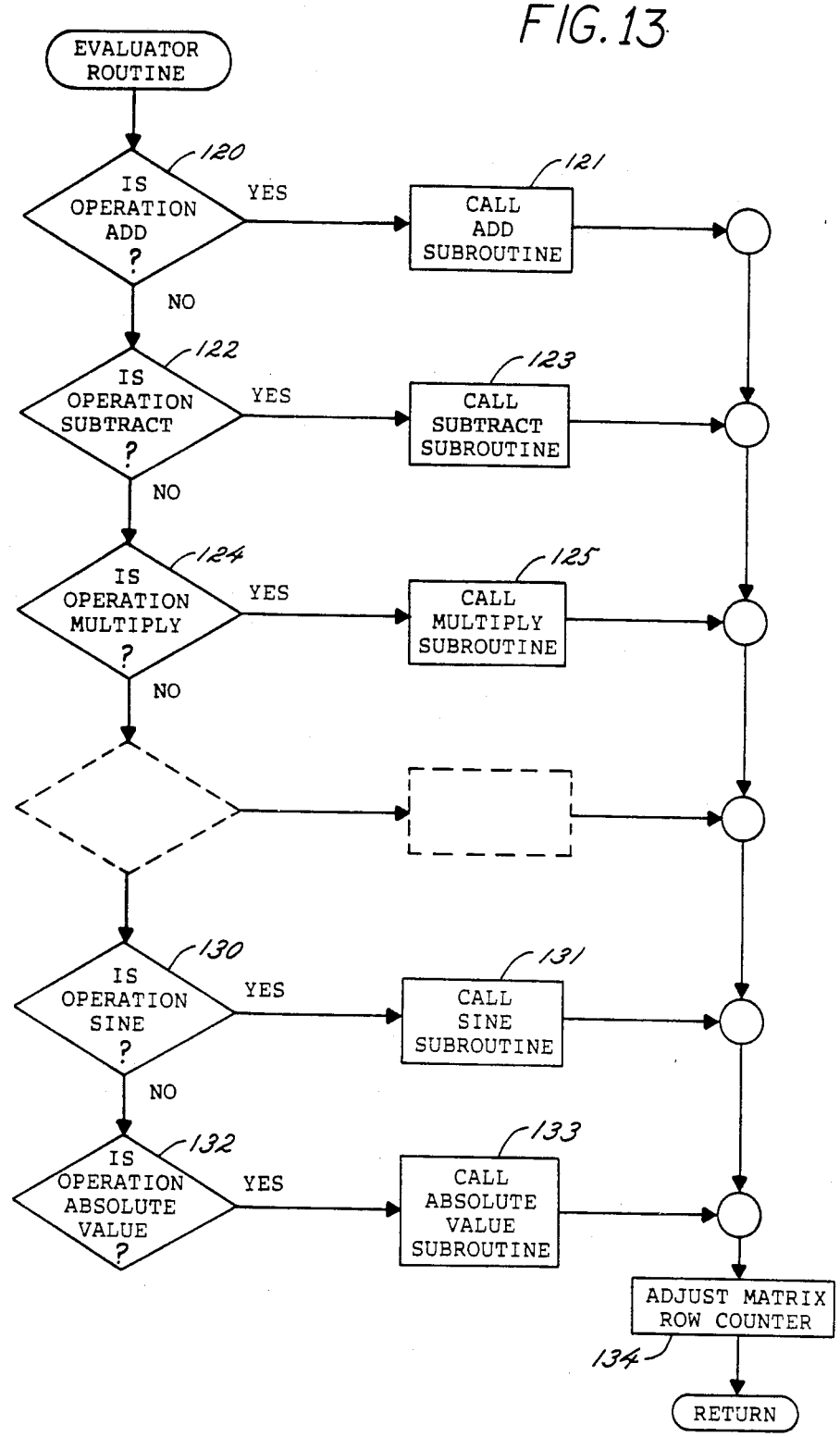
FIG. 13 is a flow chart representation of the EVALUATOR ROUTINE of the present invention.

Turning now to FIG. 13, there is shown a flow chart representation of the EVALUATOR ROUTINE which is called by the interpreter when an evaluation matrix operation is to be performed. The interpreter supplies to the evaluator information from the top row of the operator stack and references to the operands needed for the operation. A number of operation subroutines are used by the evaluator to perform the various matrix manipulations which will result in the generation of partial derivatives as specified by a particular operation. Beginning in step 120, if the operation involved in the differential evaluation is addition, then the routine calls the ADD SUBROUTINE in step 121 then continues to step 134. If the operation is not addition, then step 122 determines if the operation is subtraction. If the operation is subraction, then the SUBTRACT SUBROUTINE is called in step 123 and then the procedure continues to step 134. As can be seen from the remaining steps in the flow chart, similar steps are provided for any number of operations and their associated subroutines.

Each individual subroutine is responsible for determining and storing in the matrix, the values of the resulting operation and all the first and second partial derivatives. The subroutines perform the specific manipulations of the evaluation matrix relating to their particular operation, resulting in the operation being performed and all partial derivative values being entered in the corresponding row in the evaluation matrix. After the specified operation has been performed, then the procedure continues to step 134. In step 134, the evaluation matrix row counter is adjusted to compensate for the reduction in the number of rows by one if the operation performed required two operands. As mentioned previously, if an operation requiring two operands is performed, then the two rows corresponding to these operands are used in the evaluation. In this case, the top row is no longer needed and is eliminated from the matrix, while the second to top row is used to store the new values resulting from the operation. The procedure then returns back to the interpreter after step 134.

During each call to the EVALUATOR ROUTINE by the interpreter, one of a number of operation subroutines are called for manipulating elements of the evaluation matrix in corresponding with the various mathematical rules which apply to the associated operation. Each of these subroutines contains a set of instructions for carrying out the required matrix manipulations. For example, the ADD SUBROUTINE contains the set of instructions required to add the values of the row of elements corresponding to the first operand to the values of the row of elements corresponding to the second operand of the operation. The complexity of these instructions vary from one particular operation to the next, but corresponds to the relative complexity of the mathematical rule being represented. The ADD SUBROUTINE is relatively simple, involving only the addition of the values in two rows. In contrast however, the MULTIPLY SUBROUTINE is rather complicated, involving a number of additions and cross-multiplications of various column members of the rows involved.

As an example of how a set of these instructions may be implemented for a specific operation, FIG. 14 shows the various mathematical rules representing the zeroth, first, and second order partial derivatives of an expression which involves the multiplication of two operands, along with a routine coded in the PASCAL programming language providing an implementation of these multiplication rules. It should be understood that these two operands are not necessarily operands in the sense that they are independent variables, rather they correspond to specific rows of the evaluation matrix and as such may consist of a single independent variable or may also consist of an expression involving a number of independent variables and/or constants. As can be seen, the first expression 140 defines the multiplication of the operands "a" and "b" or in other words the zeroth order derivative. The second expression 141 defines the first partial derivative with respect to any arbitrary independent variable; for this example the aribtrary independent variable is denoted "$X_1$". During a procedure utilizing these instructions, these arbitrary independent variables will take the representation of specific independent variables of the given function. For example, if the given function contained three independent variables, "r", "s", and "t", then three expressions defining the partial derivatives of the operands with respect to each of these independent variables will be used. In each instance, one may assume that the arbitrary independent variable (denoted as "$X_1$", in the second expression 141), will be replaced with the specific independent variables, such as "r", "s", then "t", in order to generate these three individual expressions. The evaluator then manipulates the values in the corresponding cells in the evaluation matrix to satisfy each one of the individual expressions. A similar technique is used for two operands as in the third expression 142 which defines the second partial derivative with respect to any two arbitrary independent variables; for this example the two arbitrary independent variables are denoted "$X_1$", and "$X_2$" respectively. It should be noted that these two independent variables need not be distinct as would be the case for "$\partial^2 Y/\partial a^2$". It should also be noted that many of the calculations involved for the evaluation of the second partial derivatives use values of the first partial derivatives and the general expression. For this reason, all second partial derivative manipulations should be done first, so that the proper values from the first partial derivatives and general expression may be used before they are recalculated. The same concept is true for the relationship between the values for the first partial derivative and the general expression.

The PASCAL instructions of FIG. 14 depict the multiplication operation and are divided into four major sections. The first section includes lines 10 through 70 and contains the declaration and initialization instructions to begin the subroutine. The second section contains the instructions which perform the manipulations and calculations for the second order partial derivatives; this section includes lines 80 through 180. The third section includes lines 190 through 210, and contains the instructions which perform the manipulations and calculations for the first order partial derivatives. The fourth and last major section performs the calculation of the zeroth order partial derivative, i.e., a direct multiplication operation. The second section which contains the second partial derivative instructions is comprised of two loops, such that the second loop includes lines 100 through 170 and is located inside the first loop which includes lines 80 through 180. These two loops sequence through all the combinations of two independent variables, and accordingly provide all corresponding calculations for the second partial derivatives. The third section which contains the first partial derivative instructions is comprised of a single loop which sequences through all the single independent variables.

In order to more clearly understand the evaluation procedure, an example in FIGS. 15A and 15B is given. Again, this evaluation matrix has originated from the equation "a*(b−c)" and the current operation the evaluator is to perform is the subtraction of "c" from "b". The specified values of the independent variables "a", "b" and "c" are, respectively, "10", "6" and "3" as shown in FIG. 15A. In this example of a subtraction operation, the evaluator will execute the set of instructions for a partial derivative subtraction operation, i.e., the partial derivative with respect to all independent variables for one operand substracted from another. These subtraction instructions have been coded so that the general subraction partial derivative rules are applied properly, these being: "Y=b−c" for computation of a constant value; "$\partial Y/\partial x_1 = \partial b/\partial x_1 - \partial c/\partial x_1$" for the first partial derivative computations; and $$\text{“} \frac{\partial^2 Y}{\partial x_1 \partial x_2} = \frac{\partial^2 b}{\partial x_1 \partial x_2} - \frac{\partial^2 c}{\partial x_1 \partial x_2} \text{”}$$

for second partial derivative computations. The evaluator is called for the subtraction operation and subtracts the top row from the second from the top row and places the results in the second from top row as shown in FIG. 15B. The value of each respective column is computed starting from column 10 and working back to column 1. As in all operations which involve two operands, after the subtraction operation is completed the top row of the evaluation matrix is no longer used and the former second to top row becomes the top row, effectively reducing by one the number of rows in the matrix. This is clearly seen through a comparison of the matrix in FIG. 15A which has 3 rows, and the matrix of FIG. 15B which has been reduced to 2 rows. The next operation (not shown) of this equation is the multiplication which will complete all the evaluations, reduce the number of rows by one again, and result in all the partial derivatives being found in the bottom and only row of the matrix.

Turning now to FIGS. 16A–16H, there is shown an example depicting the arrangement and various values present in the evaluation matrix during the steps required to evaluate the partial derivatives of the function "cos (a)+b+c*3", where the user desires the function to be evaluated at values of the independent variables a=1.264 radians, b=−3.791 and c=2.583. As can be seen, the evaluation of the partial derivatives is done in 8 steps of the evaluator, and uses no more than 3 rows of the evaluation matrix. The first step in FIG. 16A consists of filling in one row of the evaluation matrix for the independent variable "a". The value of this variable is placed in the value or first column, and the second column, which corresponds to the first partial derivative with respect to "a", (i.e. with respect to itself) is set to 1. All other columns are set to a 0 value, since the partial derivative of one independent variable with respect to a different independent variable is 0.

The next step in FIG. 16B shows the evaluation matrix after the evaluator has applied the appropriate rules for a cosine function. Again, all the partial derivatives for this row are evaluated right at this step. Row 1 now designates the expression "cos (a)" and contains all the partial derivatives relating to this expression. The next step in 16C simply involves the independent variable "b" being included in a new row in the matrix. The fourth step as shown in FIG. 16D shows the arrangement and values of the matrix after the addition operation has taken place. The evaluator has completed the appropriate addition operation for the expression "cos (a)+b". The "cos (a)" expression was taken from row 1, while the "b" expression was taken from row 2, and the combined resulting expression was placed back in row 1. At this point, row 2 which corresponds to "b" is no longer needed and is no longer a part of the matrix, and the matrix currently consists of only one row. The fifth step of the evaluation is merely the insertion of a new row corresponding to the independent variable "c", as shown in FIG. 16E. Since the next operator encountered at this point is multiplication, and the previous operator is addition, the interpreter realizes the multiplication operation has a higher priority and must be done first. The next step in FIG. 16F involves the insertion of the second operand, the constant of value "3", into the evaluation matrix. The matrix now contains 3 rows and may proceed with the multiplication operation. Next, FIG. 16G shows the evaluation matrix after the multiplication of "c" from row 2 by "3" from the former row 3. The result has been placed back in row 2 with all the corresponding partial derivative values having been calculated. Row 3 is no longer needed, and is eliminated from the matrix.

The last step of the operation involves the addition of the expression "cos (a)+b" from row 1, to the expression "c*3" from row 2. This addition operation is completed by the evaluator, all the corresponding partial derivatives are computed and the results are placed in a row 1, as shown in FIG. 16H. This last remaining row then contains all the partial derivatives for the expression "cos (a)+b+c*3" for the independent variable values of "a=1.264", "b=3.791" "c=2.583". Control of the procedure is now given to the output routine to display or otherwise output the various values of the partial derivatives.

As can be seen from the above detailed description and examples, the present invention provides a novel method and apparatus for the organization and control of a computer memory system which is used to evaluate partial derivatives of a given function. The method completes the evaluations through the use of an organized evaluation matrix containing values relating to partial derivatives, and several other memory elements to control the transfer and manipulation of information in this evaluation matrix. By using a relatively few number of manipulations and calculations the partial derivatives are evaluated, thereby substantially minimizing the time required to complete the evaluations and also substantially minimizing the numerical error in the final partial derivative values.

| PARSING DEFINITIONS | | | | |
|---|---|---|---|---|
| Equation Element | Priority Code | Type Code | Number Code | Separator | Group |
| Operand | 8 | 1 | 1-999 | | |
| Constant | 8 | 2 | 1-999 | | |
| + | 3 | 0 | 1 | S | 1 |
| − | 3 | 0 | 2 | S | 1 |
| * | 4 | 0 | 3 | S | 1 |
| / | 4 | 0 | 4 | S | 1 |

-continued

| PARSING DEFINITIONS | | | | |
|---|---|---|---|---|
| Equation Element | Priority Code | Type Code | Number Code | Separator | Group |
| ( | 7/0 | 0 | 5 | S | 2 |
| ) | 0 | 5 | 6 | S | 2 |
| = | 2 | 0 | 7 | S | 3 |
| ! (Init.) | −1 | 0 | 8 | S | 4 |
| # (end) | 1 | 4 | 9 | S | 4 |
| ↑ | 6 | 0 | 10 | S | 7 |
| SIN | 5 | 0 | 11 | | 5 |
| COS | 5 | 0 | 12 | | 5 |
| EXP | 5 | 0 | 13 | | 6 |
| ln | 5 | 0 | 14 | | 6 |
| LOG a | 5 | 0 | 15 | | 6 |
| log | 5 | 0 | 16 | | 6 |
| SQRT | 5 | 0 | 17 | | 7 |
| ABS | 5 | 0 | 18 | | 8 |
| ARCTAN | 5 | 0 | 19 | | 9 |

We claim as our invention:

1. Apparatus for evaluating the partial derivatives of a given function with respect to the independent variables of said function at specified values of said independent variables comprising, in combination memory means containing:
   a matrix for a parsed list having a row for each element of said function and columns for at least a priority and a code assigned to each element,
   an operator stack for receiving said priority and code from said parsed list for each operator in said function,
   an evaluation martix for receiving information relating to the operands in said function and said specified values of said independent variables at which the partial derivatives are to be evaluated,
   a parser for parsing said function and storing information related to said function in said parsed list,
   an evaluator having a plurality of rules related to the respective operators, said rules specifying manipulations to be performed on particular columns in one or more rows of said evaluation matrix,
   an interpreter for comparing the priorities of a particular element in said parsed list and a particular element in said operator stack, and in response thereto for either:
   (a) routing information related to said particular element in said parsed list to said operator stack or said evaluation matrix in dependence on the nature of said element, when said comparison indicates the priorities are in a predetermined relationship, or
   (b) when said comparison indicates the priorities are not in said predetermined relationship, causing said evaluator to apply the rule associated with the operator in the then-uppermost element of the operator stack to the information in the then-uppermost row or rows of the evaluation matrix.

2. The apparatus according to claim 1, wherein the priorities are in said predetermined relationship when the priority of said particular element in said parsed list is greater than the priority of said particular element in said operator stack, and wherein the priorities are not in said predetermined relationship when the priority of said particular element in said parsedlist is less than or equal to the priority of said particular element in said operator stack.

3. Apparatus for evaluating the partial derivatives with respect to the independent variables of a given function at specified values of said independent variables comprising, in combination memory means containing a plurality of storage areas arranged to provide the following memory components:
- an operator stack for storing information identifying the operator type and priority for a plurality of operators within said function,
- an evaluation matrix for storing information relating to the assigned values and partial derivatives of a given independent variable with respect to all independent variables of said function,
- a parsed list for storing information relating to each of the elements of said function including an identification of the element type and priority associated with each element type,
- memory locations for storing values assigned to the independent variables at which the partial derivatives of said function are to be evaluated,
- a parser for parsing the function into its individual elements, the parser including means for assigning identifying codes and priorities to each parsed element and entering said priorities and identification codes into said parsed list,
- an evaluator adapted to apply a plurality of rules related to the respective operators, each of said rules adapted to (1) specify operations to be performed on information in one or more rows of said evaluation matrix and (2) store the results of said manipulations in predetermined columns in one or more rows of said evaluation matrix,
- an interpreter for extracting information from a particular element in said parsed list and in response thereto for controlling the transfer of information to said operator stack and said evaluation matrix, said interpreter including:
  - means for comparing the priority of said particular element in said parsed list with the priority of a particular element in said operator stack,
  - means for routing information related to said particular element in said parsed list to said operator stack or said evaluation matrix in dependence on the nature of said element, when said comparison indicates the priorities are in a predetermined relationship,
  - and means for causing said evaluator to operate on the information in one or more rows of said evaluation matrix when said comparison indicates the priorities are not in said predetermined relationship.

4. The apparatus according to claim 3, wherein the priorities are in said predetermined relationship when the priority of said particular element in said parsed list is greater than the priority of said particular element in said operator stack, and wherein the priorities are not in said predetermined relationship when the priority of said particular element in said parsed list is less than or equal to the priority of said particular element in said operator stack.

5. Apparatus for evaluating the partial derivatives with respect to the independent variables of a given function at specified values of said independent variables comprising, in combination memory means containing a plurality of storage elements arranged to provide the following memory elements:
- a parsed list comprising a matrix having a row for each of the elements of said function and columns for identifying the element type and a priority associated with each element type,
- an operator stack for storing information relating to a plurality of operators of said function,
- an evaluation matrix comprising a matrix having rows containing information relating to said independent variables of said function and columns containing information relating to the partial derivatives of the row members with respect to combinations of one or more of said independent variables,
- memory locations for storing values assigned to said independent variables at which the partial derivatives of the function are to be evaluated,
- a parser for parsing said function into its individual elements, the parser including means for assigning identifying codes and priority codes to each parsed element and entering said priority and identifying codes in the associated columns of sequential rows in said parsed list, said priority codes containing information for determining the order of evaluation of the elements of said function,
- an evaluator including mens for applying a plurality of rules related to the respective operators of said function, each of said rules adapted to (1) specify operations to be performed on information in one or more rows of said evaluation matrix and (2) store the results of said manipulations in predetermined columns of one or more rows of said evaluation matrix,
- an interpreter for extracting information from the rows of the parsed list in sequence and in reponse thereto for controlling the transfer of information to said operator stack and said evaluation matrix, said interpreter including:
  - means for comparing the priority of a particular element in said parsed list with the priority of a particular element in said operator stack,
  - means for routing information related to said particular element in said parsed list to said operator stack or said evaluation matrix in dependence on the nature of said particular element, when said comparison indicates the priorities are in a predetermined relationship,
  - and means for causing the evaluator to operate on the information in one or more rows of said evaluation matrix when said comparison indicates the priorities are not in said predetermined relationship, some of said operations causing a reduction in the number of rows of said evaluation matrix,
whereby said evaluation matrix is reduced to a single row after said interpreter has sequenced through all the elements in said parsed list, said single row containing the partial derivatives of said independent variables of said given function evaluated at the specified values.

6. The apparatus according to claim 5, wherein the priorities are in said predetermined relationship when the priority of said particular element in said parsed list is greater than the priority of said particular element in said operator stack, and wherein the priorities are not in said predetermined relationship when the priority of said particular element in said parsed list is less than or equal to the priority of said particular element in said operator stack.

7. A method of evaluating the partial derivatives of a function comprising the steps of
(a) specifying the function, (b) specifying the values for the independent variables at which the partial derivatives of the function are to be evaluated, (c) parsing the function into individual elements and associating with each element a predetermined priority determined by the nature of said element, said parsing resulting in a parsed list of elements, (d) sequencing through individual elements of said parsed list and routing said elements to an operator stack or a row of an evaluation matrix in dependence on the nature of said element for so long as the priority assigned to said element in said parsed list bears a predetermined relationship to the priority of the element at the top of said operator stack, (e) when the said priorities are not in said predetermined relationship, manipulating the contents of one or more rows of said evaluation matrix in accordance with a rule predetermined by the operator type of said element at the top of said operator stack, some of said manipulations reducing the number of rows in said evaluation matrix, (f) returning the result of said manipulation to one or more rows of said evaluation matrix, (g) continuing steps d-f in dependence on the respective said priorities until (step d) has sequenced through every element in said parsed list, and (h) maintaining the information in one row of said evaluation matrix as the partial derivatives of said specified function at said specified values of said independent variables.

8. The method according to claim 7, wherein the priorities are in said predetermined relationship when the priority assigned to said element in said parsed list is greater than the priority of the element at the top of said operator stack, and wherein the priorities are not in said predetermined relationship when the priority assigned to said element in said parsed list is less than or equal to the priority of the element at the top of said operator stack.

* * * * *